United States Patent [19]

Soderquist et al.

[11] Patent Number: 4,968,438

[45] Date of Patent: * Nov. 6, 1990

[54] GALLIC ACID AS AN OXYGEN SCAVENGER

[75] Inventors: Cynthia A. Soderquist, Bolingbrook; John A. Kelly, Crystal Lake, both of Ill.; Frederick S. Mandel, Marinette, Wis.

[73] Assignee: Nalco Chemical Company, Naperville, Ill.

[*] Notice: The portion of the term of this patent subsequent to May 29, 2007 has been disclaimed.

[21] Appl. No.: 273,125

[22] Filed: Nov. 17, 1988

Related U.S. Application Data

[63] Continuation of Ser. No. 98,576, Sep. 18, 1987, abandoned.

[51] Int. Cl.$^5$ ............................................. C02F 1/20
[52] U.S. Cl. ..................................... 210/750; 210/757; 252/188.28; 422/17
[58] Field of Search ................. 210/750, 757; 422/16, 422/17; 252/178, 188.28, 393, 404

[56] References Cited

U.S. PATENT DOCUMENTS

| | | | |
|---|---|---|---|
| 3,425,954 | 2/1969 | Ruzevick | 422/17 |
| 3,696,044 | 10/1972 | Rutledge | 422/17 |
| 4,219,433 | 8/1980 | Manabe | 422/17 |
| 4,234,440 | 11/1980 | Hirozawa | 422/17 |
| 4,240,925 | 12/1980 | Tait | 252/389 |
| 4,269,717 | 5/1981 | Slovinsky | 210/750 |
| 4,278,635 | 7/1981 | Kerst | 422/14 |
| 4,289,645 | 9/1981 | Muccitelli | 252/188.28 |
| 4,311,599 | 1/1982 | Slovinsky | 210/757 |
| 4,324,675 | 4/1982 | Barthold | 422/17 |
| 4,356,301 | 10/1982 | Gleim | 528/487 |
| 4,389,371 | 7/1983 | Wilson | 422/17 |
| 4,414,350 | 11/1983 | Hall | 524/320 |
| 4,419,327 | 12/1983 | Kelly et al. | 422/17 |
| 4,433,340 | 4/1984 | May | 422/17 |
| 4,549,968 | 10/1985 | Muccitelli | 252/188.28 |
| 4,626,411 | 12/1986 | Nemes | 210/750 |
| 4,929,364 | 5/1990 | Reardon et al. | 210/750 |

OTHER PUBLICATIONS

Rosenberg, S. P., "The Inhibition of Aqueous Corrosion of Iron", by Gallic Acid presented at the Australian Corrosion Association Conference held at Adelaide on Nov. 17-21, 1986.

Ger. (East) DD 1603114 T, Jun. 1, 1983, 12 pp; Appl. 227201, Jan. 27, 1981; Chemical Abstract 99:162755w.

Jpn. Kokai Tokkyo Koho JP 57/204288 A2 (82/204288), Dec. 14, 1982, 7 pp.; Appl. 81/89487, Jun. 12, 1981; Chemical Abstract 98:185371m.

U.S. Pat. No. 4,240,925, Dec. 23, 1980, 5 pp.; Appl. or Pr. 930280, Aug. 2, 1978; Chemical Abstract 94:107980n.

Ger. Offen De 3507102 A1, Sep. 12, 1985, 18 pp.; Appl. 3507102, Feb. 28, 1985; GB Appl. 84/5860, Mar. 6, 1984; Chemical Abstract 104:9522v.

Brit. UK Pag. Appl. GB 2138796 A1, Oct. 31, 1984, 5 pp.; Appl. 83/11059 Apr. 22, 1983; Chemical Abstract 102:118203w.

Ger. (East) DD 160285 Z. May 25, 1983, 6 pp.; Appl. 230100, May 20, 1981; Chemical Abstract 99:179939g.

U.S. Pat. No. 3,833,513, Sep. 3, 1974, 6 pp.; Appl. or Pr. 224,308, Feb. 7, 1972; Chemical Abstract 82:158621f.

Japan. JP 49/27247 (74/27247), Jul. 16, 1974, 22 pp.; Appl. or Pr. 69 60,928, Aug. 2, 1969; Chemical Abstract 82:114824v.

U.S. Pat. No. 3,790,481, Feb. 5, 1974, 4 pp.p Appl. or Pr. 652,697, Jul. 12, 1967; Chemical Abstract 81:15384z.

Ger. (East) DD 95839, Feb. 20, 1973, 7 pp.; Appl. or Pr. 149 714, Aug. 26, 1970; Chemical Abstract 79:145939d.

U.S. Pat. No. 367,427, Oct. 10, 1972, 4 pp.; Appl. or Pr 139,182, Apr. 30, 1971, Chemical Abstract 78:74581x.

Brit. GB 1180387, Feb. 4, 1970, 9 pp.; Jul. 21, 1966; Chemical Abstract 68:26988x.

U.S. Pat. No. 3,578,505, May 11, 1971, 4 pp.; Apr. 12, 1967; Chemical Abstract 75:39474f.

Primary Examiner—Tom Wyse
Attorney, Agent, or Firm—Anthony L. Cupoli; Donald G. Epple

[57] ABSTRACT

An improved method for scavenging dissolved oxygen from waters used to generate steam which comprises treating said waters with at least 0.3 mole of gallic acid per mole of oxygen contained in said boiler waters.

An aqueous concentrate useful for treating boiler waters to scavenge oxygen therefrom which contains at least 0.3% by weight of gallic acid. This aqueous concentrate has a pH adjusted to at least 8.5.

3 Claims, No Drawings

GALLIC ACID AS AN OXYGEN SCAVENGER

This is a continuation of co-pending application Ser. No. 098,576 filed on Sept. 18, 1987, abandoned.

DEFINITIONS

The term "percent" (%) means percent by weight. The term "gallic acid", also known as 3, 4, 5-trihydroxy benzoic acid, includes the salts of gallic acid present in the system.

INTRODUCTION

The presence of trace levels of dissolved oxygen is one of the major causes of boiler system corrosion. In addition, if the boiler water pH is allowed to become acidic, corrosion is accelerated.

In most systems, the levels of dissolved oxygen can be reduced to less than 10 parts per billion with mechanical deaeration. Even this small amount of oxygen is corrosive at boiler system temperatures and pressures.

Removal of the last traces of oxygen is accomplished by treating the water with a reducing agent that serves as an oxygen scavenger. Hydrazine and sulfite are widely used for this purpose, but they have some shortcomings.

Sodium sulfite, although an effective scavenger, is not recommended for use in systems operating above 1,000 psi because breakdown occurs to form corrosive hydrogen sulfide and sulfur dioxide. Also, sodium sulfite increases the amount of dissolved solids, as well as the conductivity, in the boiler water.

Hydrazine is not as active as sulfite in its reaction with oxygen but the products of the reaction are all volatile. Unfortunately, hydrazine is a listed carcinogen and must be handled with care in all applications.

It would be advantageous to provide an oxygen scavenger that is not carcinogenic.

THE INVENTION

The invention comprises an improved method for scavenging dissolved oxygen from waters used to generate steam which comprises treating said waters with at least 0.3 mole of gallic acid per mole of oxygen, preferably 1-2 moles of gallic acid per mole of oxygen, contained in said boiler waters.

The invention is also concerned with aqueous concentrates useful for treating boiler waters to scavenge oxygen therefrom which contains at least 0.3% up to the saturation solubility by weight of gallic acid. These aqueous concentrates have a pH of at least 8.5.

CONDITIONS OF USE AND DOSAGE

Gallic acid is an active oxygen scavenger at room temperature, and, thus will be effective as an oxygen scavenger in boiler water systems which have utilized pressure range of from 5 to 3,000 psig. Preferably the gallic acid has been found to effectively scavenge oxygen. At 185° F., a dosage of 1 mole of gallic acid per mole of dissolved oxygen resulted in 95% removal of the oxygen present after 10 minutes. The test method used oxygen saturated water fed through a flow-through pre-boiler simulator. The residence time of the treatment chemical was approximately 10 minutes. The water temperature was maintained at 185° F. and the pH controlled with sodium hydroxide. Oxygen levels were continuously monitored using an oxygen specific electrode.

As indicated, the oxygen scavenger used in the practice of the invention is capable of scavenging at dosages as low as 0.3 per one mole of oxygen present in the system. Best results are obtained when one mole or more per mole of oxygen present in boiler waters is used.

THE AQUEOUS CONCENTRATE

One of the drawbacks of using gallic acid per se is its poor solubility in water. The invention includes aqueous concentrates of this compound which are prepared by adjusting the pH of the concentrate with sodium hydroxide or other base of the type used to prevent corrosion in boilers to a pH of at least 8.5.

Acceptable bases include but are not limited to, the alkali metal hydroxides and the alkaline earth hydroxides. Preferably the base will be used in amounts sufficient to adjust the pH to at least 8.5 or greater. No advantage is obtained if the pH is adjusted to greater than 11.5.

When the waters used to prepare such a concentrate have their pH's adjusted with these bases, it is possible to dissolve in such waters between about 5-10% by weight gallic acid. Such concentrates are suited to scavenge oxygen in boiler water systems.

TABLE I

| Solvent (wt. %) | Solubility of Gallic Acid | | | |
|---|---|---|---|---|
| | % GA* | Solubility at 0 Hours | Solubility at 60 Hours | pH |
| Water | 5 | insoluble | — | — |
| NaOH, 0.002% | 5 | in solution | in solution | — |

*GA = Gallic Acid

Table II provides data for scavenging oxygen in an aqueous system using gallic acid which has been neutralized and had its pH adjusted to 9.0 with NaOH.

Table II

| Moles GA/Moles $O_2$ | % Oxygen Reduction |
|---|---|
| Temperature 185° C. | |
| 5.9/1 | 90% |
| 1.48/1 | 70% |
| 0.74/1 | 40% |
| Temperature 23° C. | |
| 4:1 | 74% |
| 1:1 | 20% |

*GA = Gallic Acid

The data in Table III was generated using the same apparatus as was used to generate the data of Table II. However, for Table III data, some modifications in the experimental procedure were made to improve temperature control and residence time:

TABLE III

| Moles GA/Moles $O_2$ | % $O_2$ Reduction |
|---|---|
| Temperature 85° C. | |
| 2:1 | 98% |
| 1:1 | 95% |
| Temperature 23° C. | |
| 1:1 | 34.5% |

*GA = Gallic Acid

Having thus described our invention, we claim:
1. An improved method for scavenging dissolved oxygen from waters used to generate steam having a temperature of at least 185° F. which comprises treating said waters with at least 0.3 mole of gallic acid per mole of oxygen contained in said boiler waters.

2. The method of claim 1 wherein at least 1 mole gallic acid per mole of oxygen is used.

3. A method for scavenging dissolved oxygen from waters having a temperature of at least 185° F. used to generate steam which comprises treating said waters with sufficient aqueous concentrate which contains at least 0.3% by weight gallic acid, said aqueous concentrate having a pH of at least 8.5% said pH having been adjusted by a base of the type used to treat boilers waters.

* * * * *